United States Patent [19]

Amico et al.

[11] 4,178,672

[45] Dec. 18, 1979

[54] APPARATUS FOR ASSEMBLING AND BANDING AN EXPANSION SHELL

[76] Inventors: Raymond F. Amico, 8235 Bitternut La., Liverpool, N.Y. 13088; Peter J. Amico, 4854 Glenfield Dr., Syracuse, N.Y. 13215

[21] Appl. No.: 906,823

[22] Filed: May 17, 1978

[51] Int. Cl.² .................. B23P 11/02; B23P 19/02
[52] U.S. Cl. .................................... 29/430; 29/235; 29/450; 29/783; 29/785; 29/788; 29/796; 29/797; 29/809
[58] Field of Search .............. 29/429, 509, 450, 430, 29/235, 809, 788, 796, 797, 283.5

[56] References Cited

U.S. PATENT DOCUMENTS

| 2,155,958 | 4/1939 | Schmidt | 29/785 X |
|---|---|---|---|
| 3,024,523 | 3/1962 | Donaldson | 29/785 X |
| 3,238,609 | 3/1966 | Nichols | 29/235 |
| 3,374,605 | 3/1968 | Satchwell | 29/785 X |
| 3,497,940 | 3/1970 | Wise | 29/783 |
| 3,568,292 | 3/1971 | Kasper | 29/235 X |
| 3,588,995 | 6/1971 | Schoepe et al. | 29/430 |
| 3,842,476 | 10/1974 | Prince | 29/283.5 X |
| 3,858,297 | 1/1975 | Scholin | 29/797 X |
| 4,000,557 | 1/1977 | Bowden | 29/235 X |

Primary Examiner—Charlie T. Moon
Attorney, Agent, or Firm—Bruns & Jenney

[57] ABSTRACT

An automatic machine for assembling and banding together the components making up an expansion shell so that the assembly can be conveniently packaged and shipped. In one embodiment, the machine contains a series of work stations arranged to assemble the bolt components within a die. The expansion shell halves are staked to a common strap and the components then passed through a combination forming gage and banding mechanism which aligns the parts in assembly and bands them together using a plastic sleeve. In a second embodiment of the invention, the expansion shells are staked to the strap prior to being loaded into the die.

14 Claims, 21 Drawing Figures

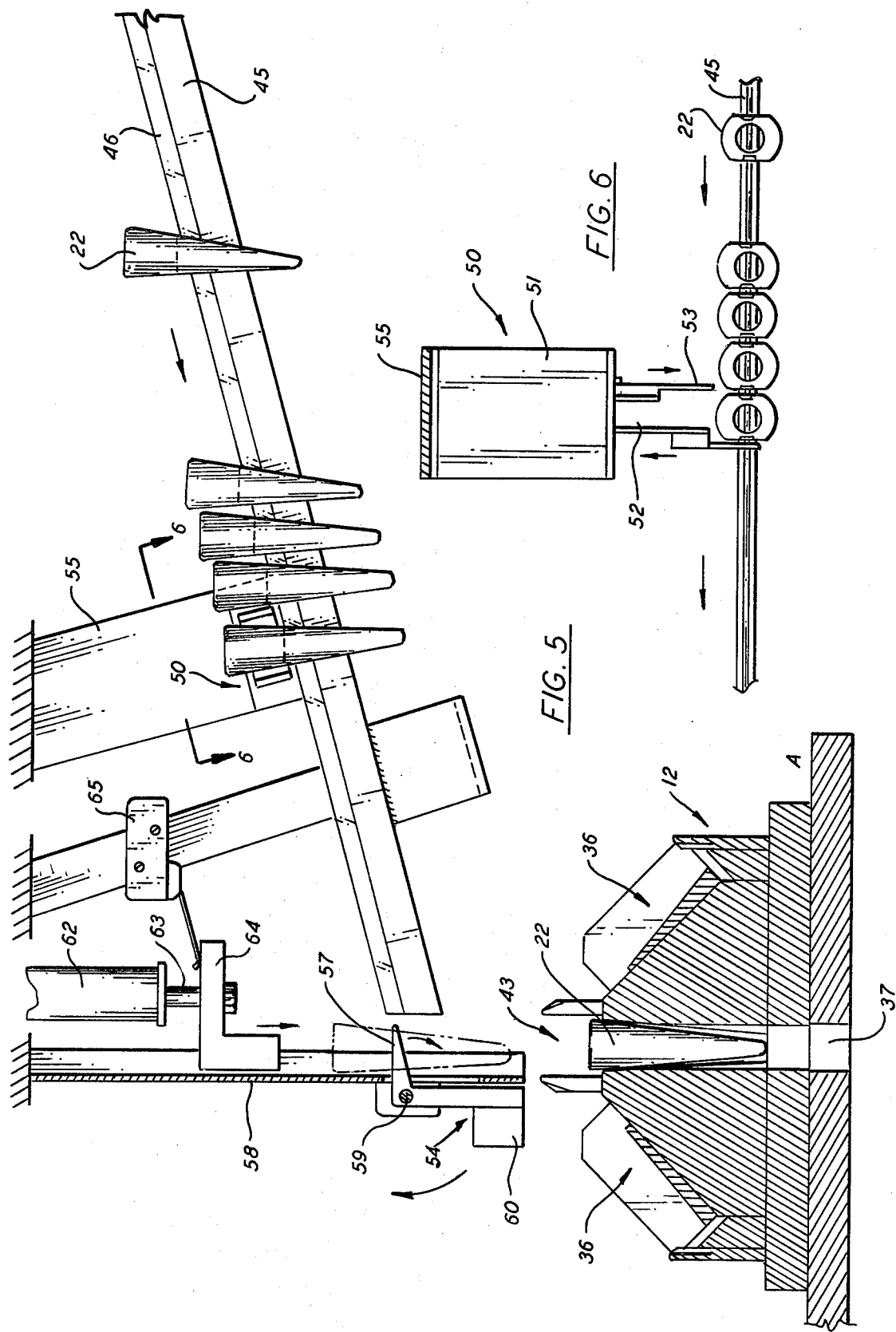

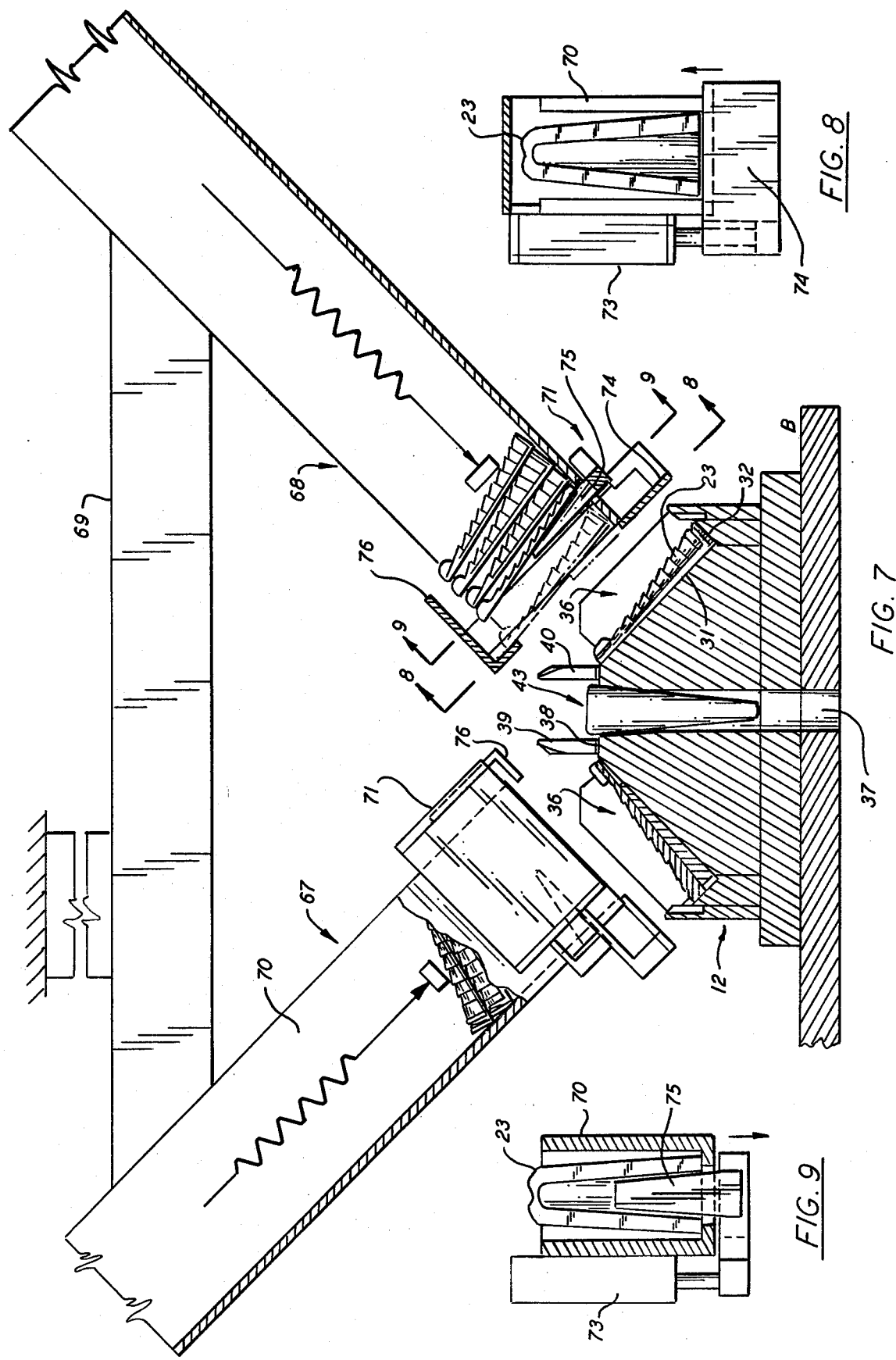

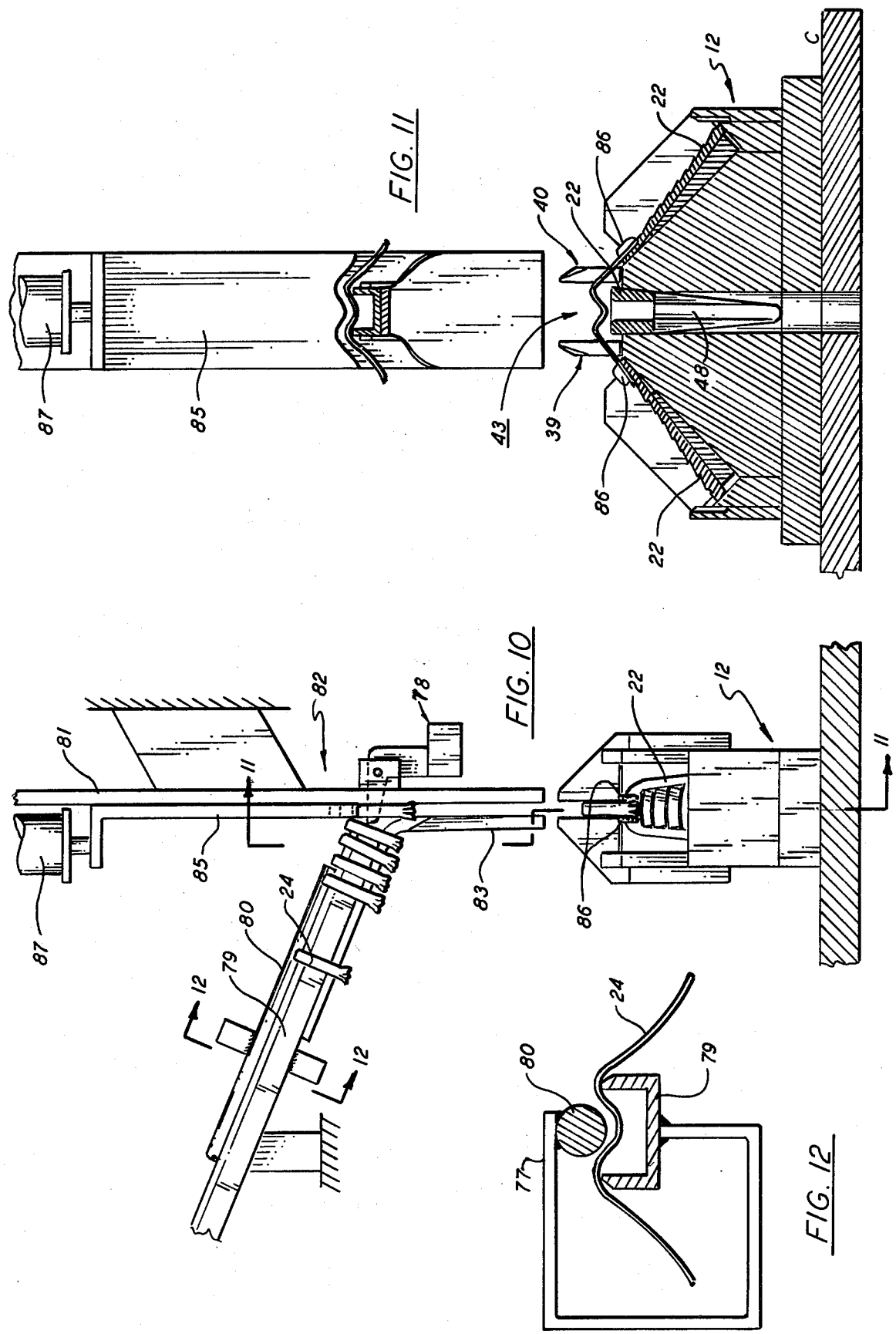

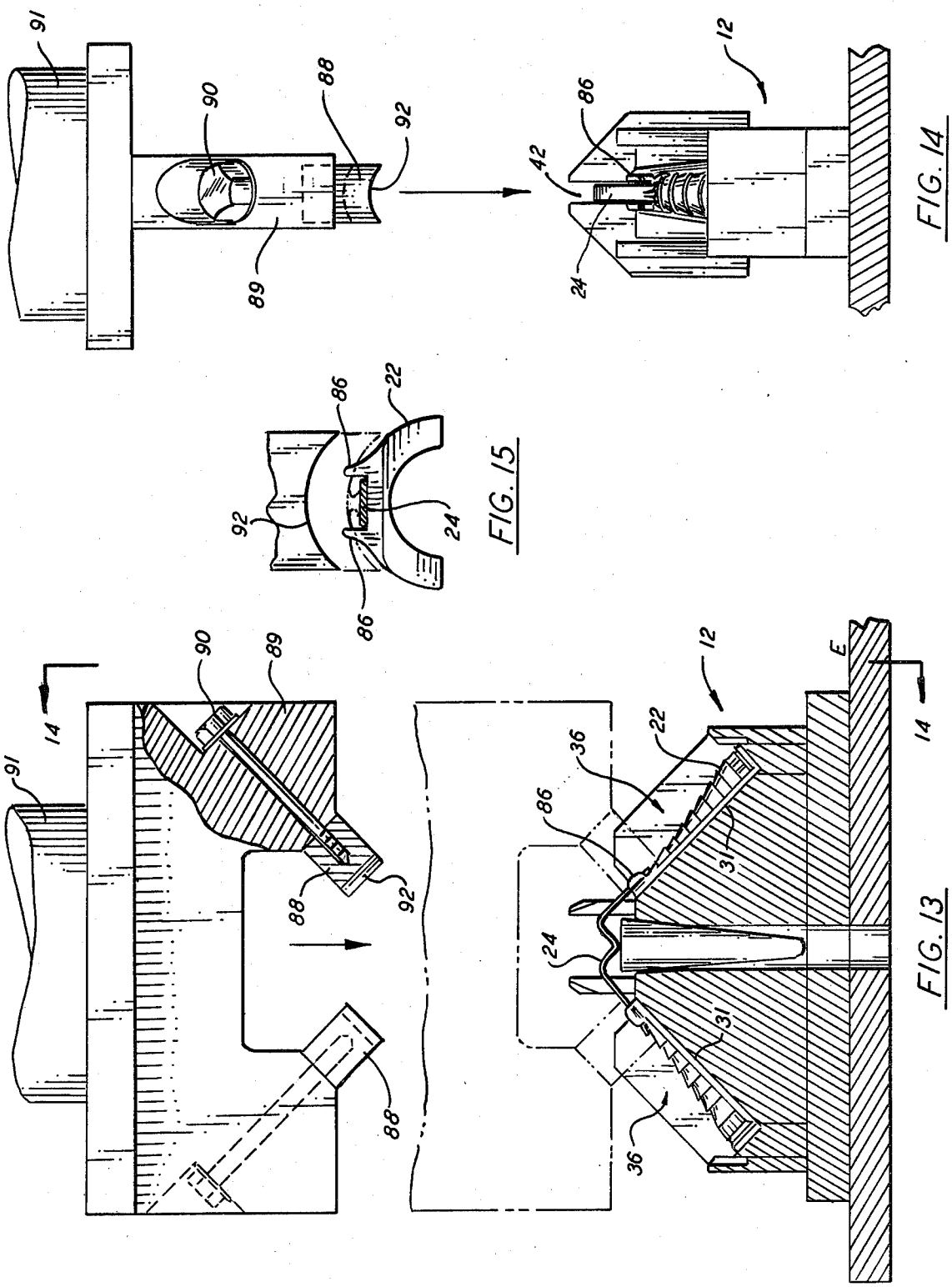

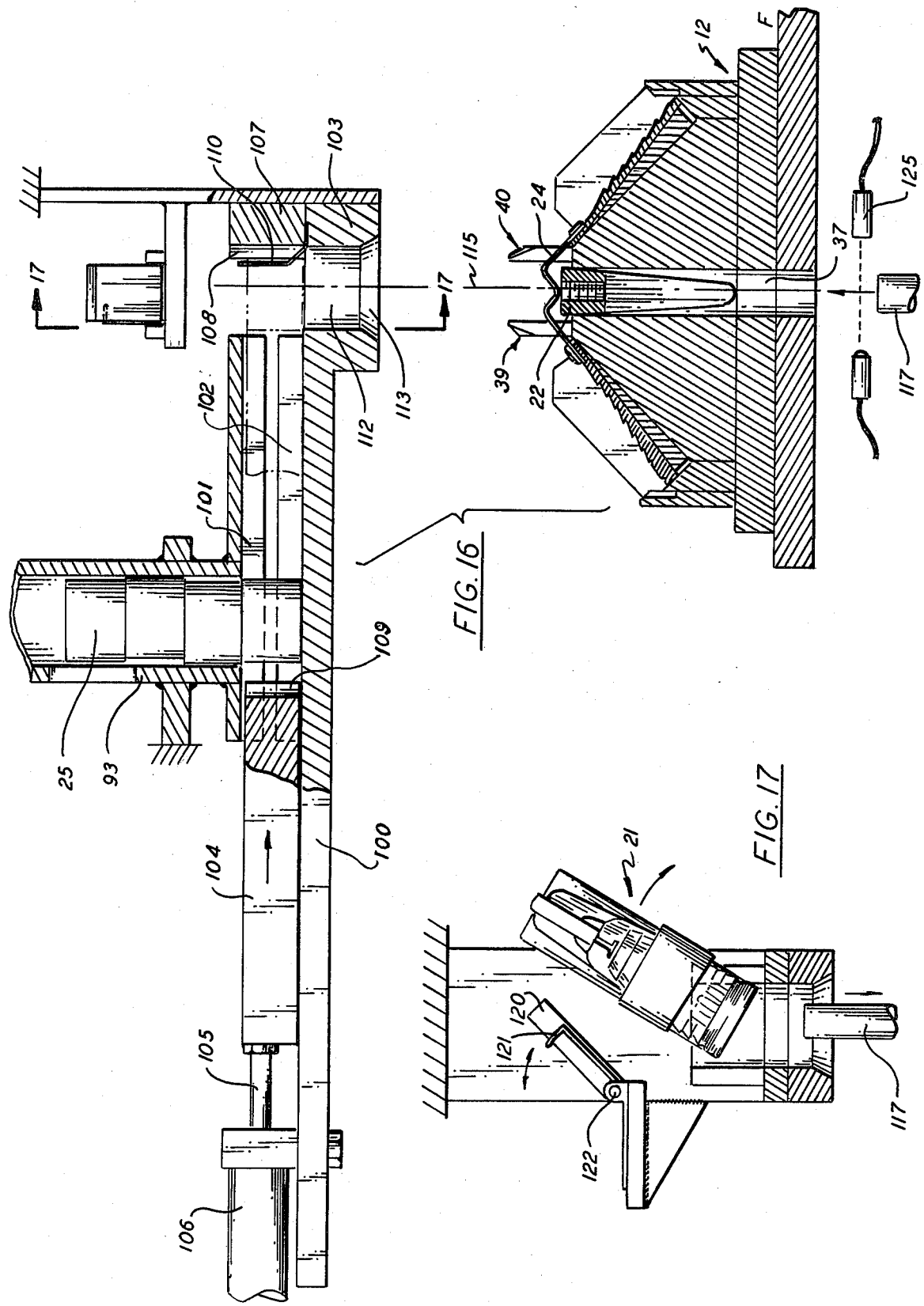

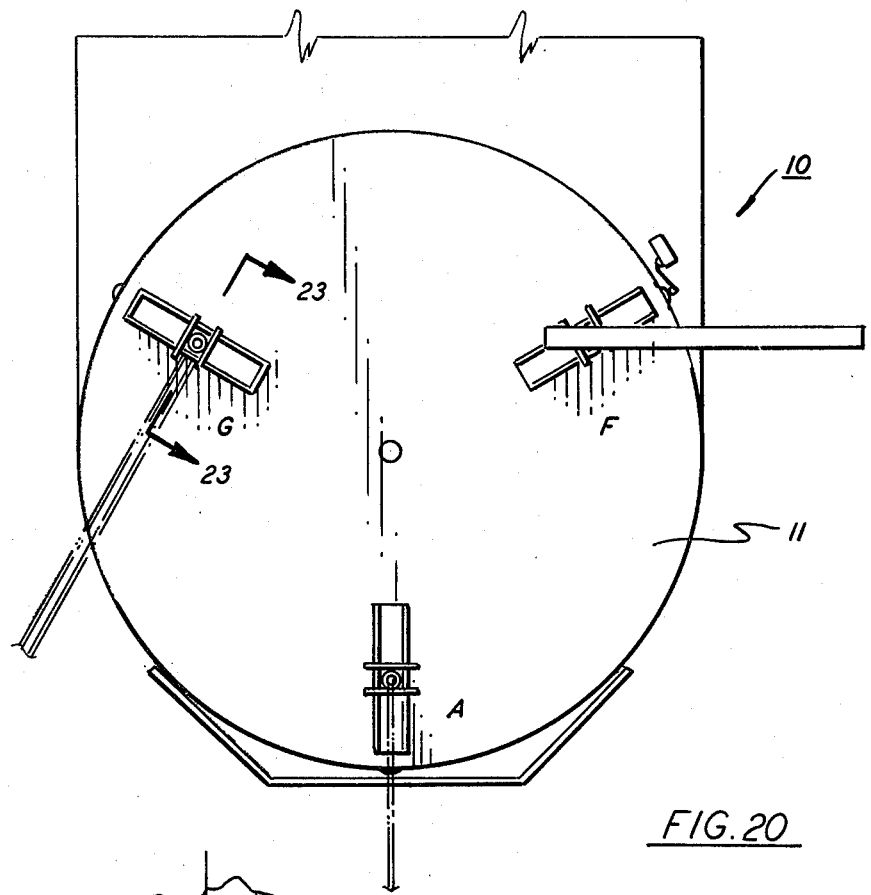
FIG. 20
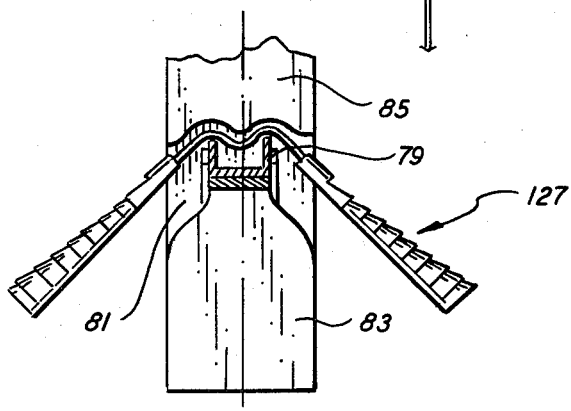
FIG. 21
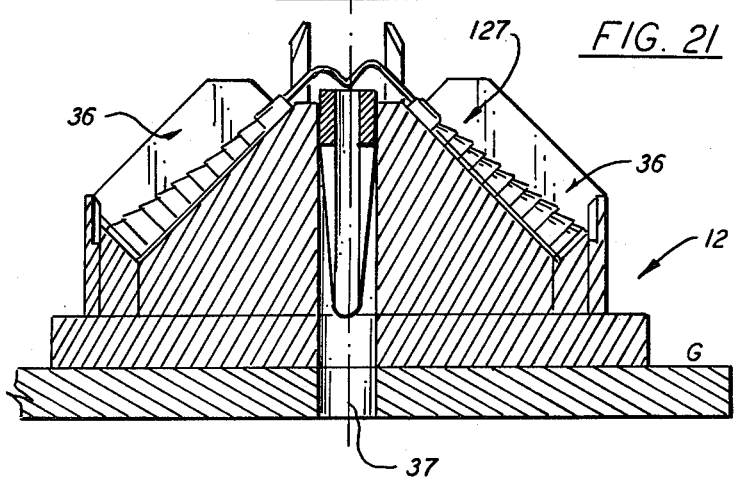

APPARATUS FOR ASSEMBLING AND BANDING AN EXPANSION SHELL

BACKGROUND OF THE INVENTION

This invention relates to apparatus for automatically assembling and banding together the component parts of an expansion shell to prevent the parts from becoming separated prior to usage.

Many types of widely used expansion or mine bolts are formed by staking two shell halves to a common strap and positioning the shell halves symmetrically about a tapered expansion wedge. A resilient sleeve is passed over the assembly which serves to hold the shell components in alignment so that the assembly will not become separated prior to actual usage.

Heretofore, the assembling and banding together of the shell components has involved a relatively large number of hand operations that are generally time consuming and costly.

To reduce the number of hand operations involved, devices have been devised for carrying out some of the assembling steps automatically. One such device is disclosed by Prince U.S. Pat. No. 3,842,476 wherein the shell halves are staked to the strap and the strap then bent about the wedge to provide an assembled but unbanded unit. The staking operation is carried out by bringing a coining tool down normal to a pair of raised ears carried by the shell halves with a high enough force to cause the ears to be deformed into locking contact against the strap. Because the tool acts normal to the work, high stresses are generated resulting in premature breaks and relatively tool life.

Regardless of how they are assembled, most expansion shells are subjected to a minimal amount of inspection. For the most part the inspection is carried out visually on a few samples selected from a large batch. The defect which is most troublesome generally involves an outwardly extended section which causes the shell to hang up in the receiving hole so that the shell spins in the hole rather than expanding outwardly.

SUMMARY OF THE INVENTION

It is therefore an object of the present invention to improve apparatus for automatically assembling expansion shells as typically used in mine bolts.

A further object of the present invention is to extend the tool life of a punch used to stake the shell halves of an expansion shell to a common strap.

Another object of the present invention is to automatically inspect mine bolt shells as they are being assembled.

A still further object of the present invention is to provide a machine for automatically bringing together the component parts of an expansion shell and banding the parts together into an assembly.

Yet another object of the present invention is to reduce the amount of hand labor required to assemble and band together the components of an expansion shell.

These and other objects of the present invention are attained by means of an automatic machine for loading the component parts of an automatic machine for loading the component parts of an expansion shell into a die, staking the shell halves to a strap and passing the components in alignment through a forming block and band applying mechanism whereby the strap is deformed about the wedge to true the halves in relation with the wedge and a sleeve is passed over the assembly to hold the parts thereof in their respective assembled positions.

In a second embodiment of the invention the shell halves are staked to the strap prior to being mounted on the die thereby reducing the number of work stations.

DESCRIPTION OF THE DRAWINGS

For a better understanding of these and other objects of the present invention, reference is had to the following detailed description of the invention to be read in conjunction with the following drawings, wherein:

FIG. 5 is an enlarged view in section taken along lines 5—5 in FIG. 2 illustrating work station A and associated mechanism for automatically loading a wedge into the die member positioned therein;

FIG. 6 is a view taking along lines 6—6 in FIG. 5 showing means to advance the wedges from storage region into the work station;

FIG. 7 is an enlarged view in section taken along lines 7—7 in FIG. 2 illustrating work station B and automatic means for loading two shell halves into the die located therein;

FIG. 8 is a section taken along lines 8—8 in FIG. 7;

FIG. 9 is also a section taken along line 9—9 in FIG. 7;

FIG. 10 is an enlarged sectional view taken along lines 10—10 in FIG. 2 illustrating work station C and associated mechanism for accurately positioning individual straps within the die located therein;

FIG. 11 is a side view in section taken along lines 11—11 in FIG. 10;

FIG. 12 is a section taken along lines 12—12 in FIG. 10;

FIG. 13 is an enlarged section taken along lines 13—13 in FIG. 2 illustrating work station E and the punch positioned therein for staking shell halves to a strap mounted in a die positioned in the work station;

FIG. 14 is an end view taken along lines 14—14 in FIG. 13;

FIG. 15 is a further enlarged view of the punch shown in FIG. 13 showing the punch moving toward a shell halve and a strap supported in the die;

FIG. 16 is an enlarged section taken along lines 16—16 in FIG. 2 illustrating work station F and the combined forming block and band applying mechanism associated therewith;

FIG. 17 is a section taken along lines 17—17 in FIG. 16 showing the assembly knock-out mechanism;

FIG. 20 is a second plan view of a work table suitable for use in the machine shown in FIG. 1 wherein the number of work stations is reduced to three; and FIG. 21 is an enlarged section taken along lines 23—23 in FIG. 20 illustrating work station G.

DESCRIPTION OF THE INVENTION

Figure 1:
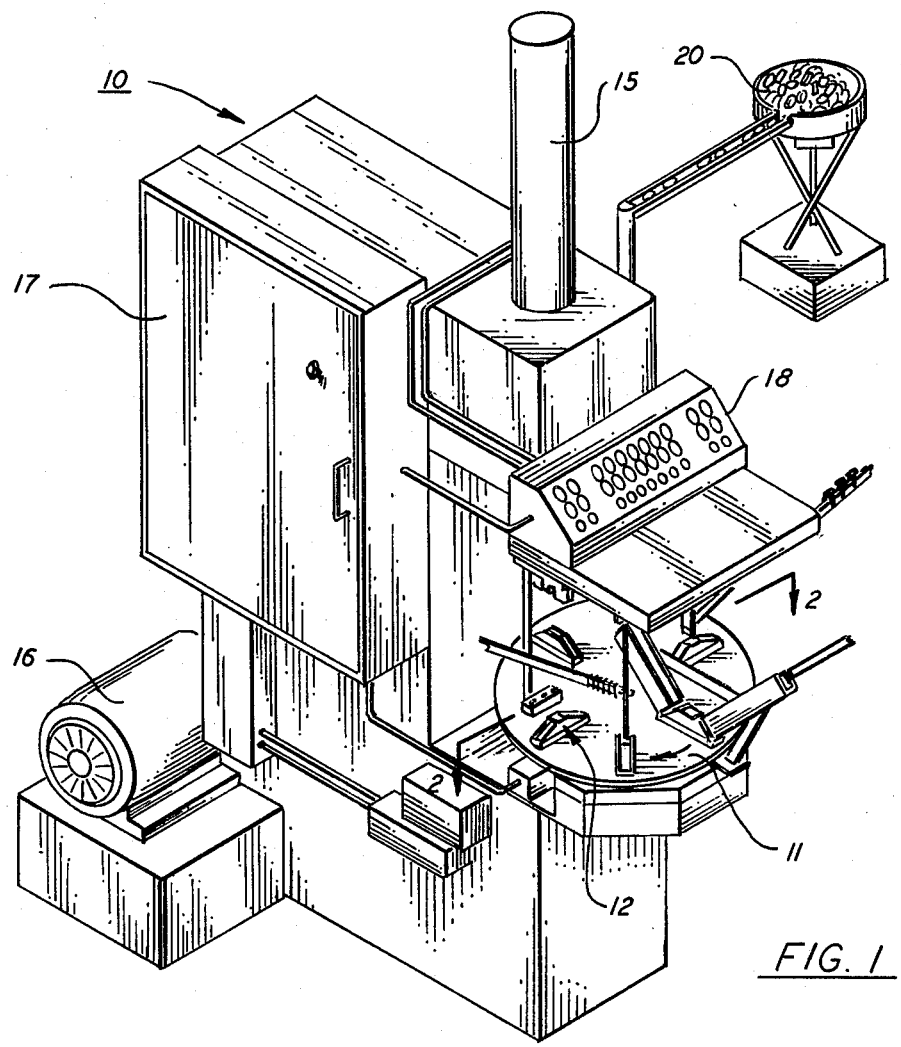
FIG. 1 is a perspective view of an automatic machine embodying the teachings of the present invention.

As illustrating in FIG. 1, the present invention is embodied in an automatic machine, generally referenced 10, for assemblying and banding together the component parts of an expansion shell of the type typically used in mine bolts for supporting the roof of a mine shaft. The machine includes a circular indexing table 11 rotatably supported in the machine frame and arranged to transport six die members 12 through a like number of work stations. The machine further includes a hydraulic ram and cylinder 15 and a motor and pump unit 16 the function of which will be explained in greater detail below. A pair of control panels 17 and 18 house the electrical and hydraulic components for operating and controlling the various machine processes. In operation, the component parts making up the shell assemblies are stored about the machine in a series of vibratory bowls that are adapted to dispense the parts into the various work stations. One of the bowls 20 is depicted in FIG. 1 and contains a plurality of resilient sleeves for banding the shell assemblies together.

Figure 4:
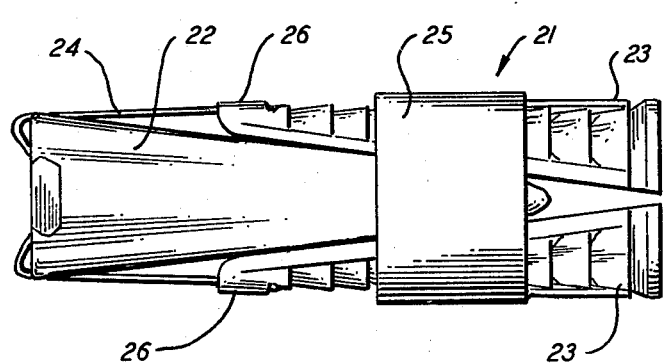
FIG. 4 shows a typical expansion shell assembly produced by the automatic machine shown in FIG. 1.

Referring now to FIG. 4, there is shown a shell assembly 21 of the type processed in the present apparatus. The assembly consists of a centrally located wedging nut 22 having a tapered body and two symmetrical expansion shell halves 26—26 joined together by a metal strap 24. The strap is joined at each end to the shell halves by means of a coining operation whereby the metal of the shell is staked against the strap at points 26—26. As is well known in the art, the mid-section of the strap is provided with a curved portion that is received within the threaded hole of the wedging nut and serves to center the shell and strap subassembly about the wedge. In operation, the shell components are formed into the assembly as shown and a resilient sleeve 25, generally made of plastic, is passed over the assembly to hold the parts in alignment whereby the shell can be conveniently handled and packaged prior to being joined to a bolt at the mine site.

Figure 2:
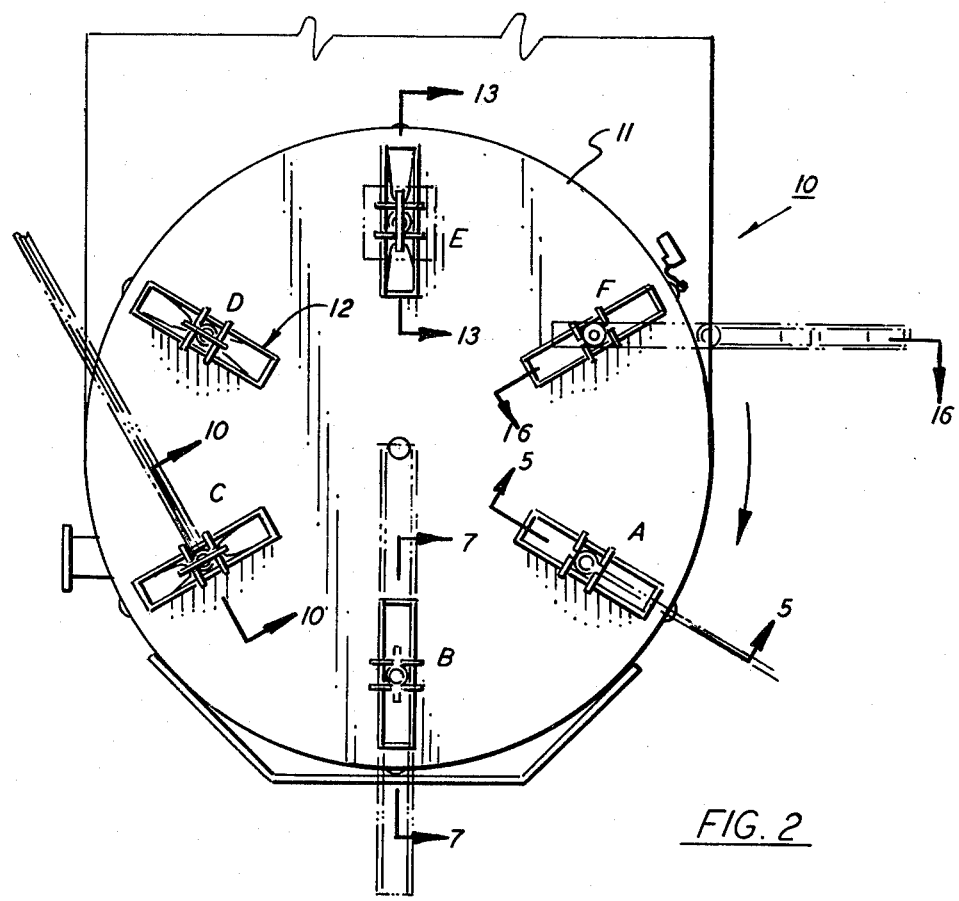
FIG. 2 is an enlarged plan view of a movable work table employed in the machine shown in FIG. 1 further illustrating the various work stations located thereabout, the view being taken along lines 2—2 in FIG. 1.

Turning now to FIG. 2, there is illustrated six work stations A–F located about the periphery of the indexing table 11. A die member 12 is positioned in each work station with the dies being circumferentially spaced about the table at 60° intervals. Through means of the machine control system the table can be indexed automatically or manually to periodically reposition each die member into the next subsequent work station. In operation, the table is turned in a clockwise direction whereby the dies are transported in an ordered sequence through each of the six work stations.

Figure 3:
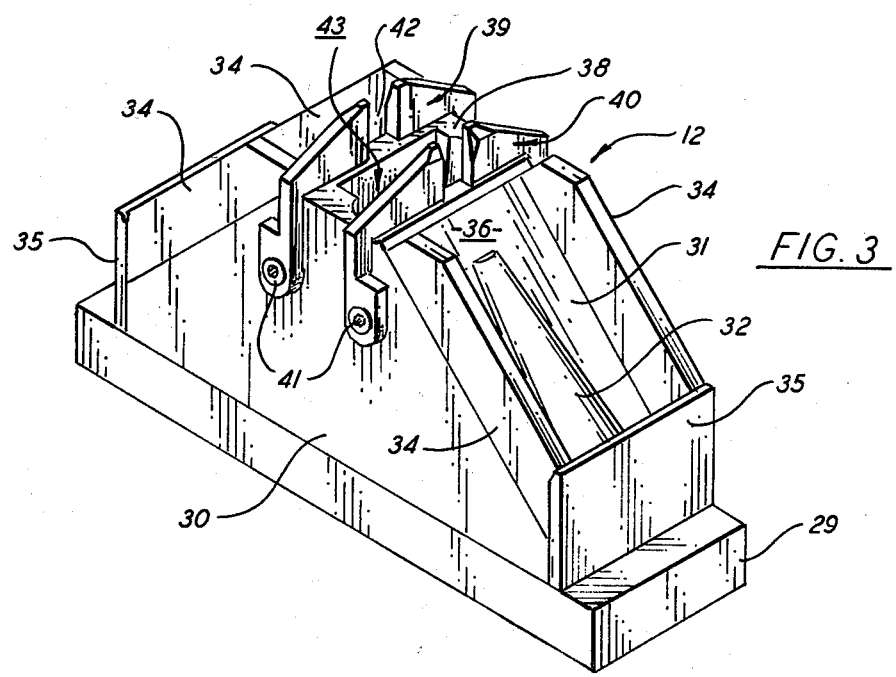
FIG. 3 is an enlarged perspective view showing one of the six die members utilized in the work stations shown in FIG. 2.

One of the six identical die members is shown in further detail in FIG. 3. The die includes a horizontal base plate 29, which is secured to the indexing table, and an anvil section 30 having a truncated pyramid configuration. The two inclined surfaces 31—31 of the pyramid shaped anvil function as shell support platforms and each contains a raised cone shaped saddle 32—32 thereon. Each saddle is adapted to compliment the inner surface of a shell whereby the shells can be securely seated upon the respective platforms. With further reference to FIG. 7, a foot rest 33, having a raised wall normal to the platform, is provided at the bottom of platform and provides a support and locating surface against which the bottom surface of a shell seated upon the saddle rests. Each of the inclined platforms is enclosed by a pair of raised side walls 34-34 and a raised end wall 35 to establish a nest into which the shells are automatically delivered.

A vertical hole 37 is centrally located in the anvil. The hole extends downwardly from the top surface 38 of the anvil and passes through both the anvil body and the underlying indexing table. The upper section of the hole is tapered to compliment the body of the wedging nut 22. As will be explained below, a wedge is inserted into the hole and caused to become automatically seated against the tapered opening so as to align itself within the die.

Strap guides 39 and 40 are secured to the side walls of the anvil via cap screws 41 to hold the guides in vertical alignment on either side of the top opening of hole 37. A vertical slot 42 is formed in each guide and adapted to receive a strap therein. In assembly, the grooves are aligned with the central axis of each cone shaped saddle and the center of opening 37. The raised guides coact with the top surface of the anvil to form a nest into which wedges are loaded.

As will be explained in greater detail below, the various components making up the expansion shell assembly are automatically loaded into each of the dies as they pass sequentially through the work stations. After loading, the hydraulic ram brings a punch down against the shells to stake the strap in place. Lastly, the components aligned on the die are passed upwardly through a forming block to shape the assembly and a plastic sleeve is passed over the assembly to prevent the assembly from separating during handling.

Initially, a wedge 22 is automatically loaded into the wedge nest of the die at work station A which has been cleared of shell components of work station F. With reference to FIGS. 5 and 6, individual wedges are delivered from a vibratory bowl onto an inclined slide 45 having a blunt edged blade 46 formed upon its upper surface. Under the influence of the vibratory bowl, the bifucated wedges straddle the blade and are fed one at a time down the blade as illustrated into the work station.

A gating mechanism 50 is located at the wedge entrance to the work station. The mechanism includes an air operated escapment 51 that is automatically activated from the machine control network. The escapment is mounted upon a bracket 55 adjacent to the slide and contains a pair of gates 52 and 53 which are adapted to move in and out of arresting contact with the parade of wedges moving down the slide. Through the escapment mechanism, the direction of motion of the gates is staggered so that one gate will be inserted into the wedge path of travel while the other is retracted.

Initially, the first wedge in the series is arrested against extended gate 52 prepatory to being moved down the slide onto a balancing mechanism 54. Upon receipt of a timed signal, indicating the balance is clear, gate 52 is retracted to release the first wedge while, simultaneously therewith, the second gate 53 is inserted into arresting contact with the second wedge in the series. Once the first wedge has cleared the gating station the position of the gates is reversed thus resetting the mechanism for a new cycle.

Upon clearing the gates, the wedge moves down the slide onto the horizontally extended arm 57 of the balance. The balance is pivotably supported in vertical wall 58 upon pin 59. A weight 60, secured to the vertical arm of the balance, is arranged to offset the weight of the weight whereby the wedge is suspended directly over the wedge nest of the die positioned in station A.

Upon the delivery of an empty die into the station, air cylinder 62, positioned above the balance, is actuated causing arm 63 to be extended downwardly. A wedge actuator 64, affixed to the arm, contacts the wedge positioned upon the balance and drives it down into the tapered end of the die opening 37. A limit switch 65 is arranged to sense the action of the air cylinder and, among other things, prevents the table from being indexed prematurely and actuates escapement 51.

With a wedge loaded into the die, the table is indexed so that the die is moved into work station B where a pair of shell halves are loaded into the two shell nests 36—36. Referring now more specifically to FIGS. 7-9, the shells are delivered into the nests from a pair of magazines 67,68 suspended above the work station from a common bracket 69. The magazines are of similar construction and operate in the same manner to carry out the loading operation.

Each magazine is generally U-shaped in cross-sectional form including an inclined channel 70 and a shell injector 71 mounted on the lower end thereof. Here again, each injector employs an air operated escapment 73, which is secured to one of the sidewalls of channel 70, to control the shell loading operation. The escapment is adapted, upon the receipt of a timed signal, to raise and lower gates 74 and 75. As shown in FIG. 7, the forward gate 74 is shown lowered while the rear gate 75 is raised.

As is the case of the wedge escapement, the first shell in the stack is resting against forward gate 74 and a head rest 76 when the die moves into the station. With the die properly indexed, the forward gate is lowered to release the foot end of the shell and, simultaneously therewith, the rear gate is raised to hold back the remaining shells in the magazine. Upon releasing the foot end of the shell, the shell is caused to swing downwardly about head rest 76 into the shell nest. By proper positioning of the magazines in regard to the die, the released shells will slide downwardly onto the saddles and align themselves against footrest 32.

After releasing the first shell in the stack from the magazine, the position of the two gates is once again reversed thereby readying the station for the next cycle. To insure that the shells loaded into the magazines will move down the channel in proper alignment, a biasing means is provided which functions to continually urge the shells downwardly into the gates.

With the shells and the wedge loaded into the die, the table is again indexed to move the die into work station C. Here a preformed strap 24 is accurately positioned in relation to both the shell halves and the wedge as best seen in FIGS. 10-12. As is well known in the art, the straps are preformed into a M-shaped configuration with the curved midsection thereof arranged to be received in the threaded hole of the wedge. The two ends of the strap are crimped so that they may be snapped between the raised ears 86 depending upwardly from the face of the shells.

Here again the straps are stored in a vibratory bowl similar to bowl 20 (FIG. 1) and moved down an inverted channel 79 into the work station. A round bar 80 is supported by means of a frame 78 in the channel opening thus forcing the straps to be aligned as shown in FIG. 12 upon the channel. A vibratory motion is imparted to the channel causing the straps to move down against vertical wall 81 of strap injecting mechanism 82. The first strap in the channel alignment is permitted to rest upon the horizontal arm of a balance 78 similar to that described above.

A spring-like member 83 is secured to the bottom of the channel and is turned downwardly whereby its lower leg is brought into parallel alignment with wall 81 to form a guideway 77. The normal gap between the back wall and the biased forward wall is slightly less than the width of the straps. In operation, the strap seated upon the balance is driven downwardly by means of plunger 85 attached to the arm of air cylinder 86. The lower end of the plunger is contoured to compliment the strap profile and thus support the strap in alignment as it is being moved into the die.

Upon moving down from the balance, the strap is forced into the guideway 77 against the biasing force of spring 83 whereby the strap maintains its desired alignment until it is released to the guides 39,40. Under the influence of the plunger, the strap is seated within the slots 42 formed in the guides and the ends thereof snapped into position between the raised ears of the shells.

Next, the table is indexed to bring the loaded die into an inspection station D where the positioning of the shell parts can be inspected. The inspection may be carried out visually by the operator or automatically by means of optical sensors, capable of shutting the machine down in the event one of the parts is misaligned.

Further indexing of the table brings the die into the staking station E wherein the ears 86 on the shells are coined into holding contact against the strap. With further reference to FIGS. 13-15, the die is indexed in station E directly below a staking tool containing a pair of punches 88—88 that are securely supported within a shoe 89 via bolts 90. Although not shown, the spindle 91 of the tool is operatively attached to the ram of the hydraulic cylinder 15 shown in FIG. 1. The working surface 92 of each punch is arcuate shaped and is offset from the horizontal plane at about the same angle as are the two platforms 31—31 of the anvil. As depicted by the phantom outline in FIG. 13, the punches are brought down into coining contact with the ears 86 of the two shell halves seated in the shell nests. Sufficient force is applied to deform the ears against the strap thus staking the two shells to the strap. As can be seen, the punches are designed to move against the ears with a sliding motion rather than coming down with a direct compressive force normal to the ears. As a result of the sliding action, the ears are coined incrimentally as the tool advances therealong thus requiring less energy and causing the tool life to be considerably extended. This sliding action has been found also to create an extremely strong mechanical bond between the strap and the shells.

Figure 18:
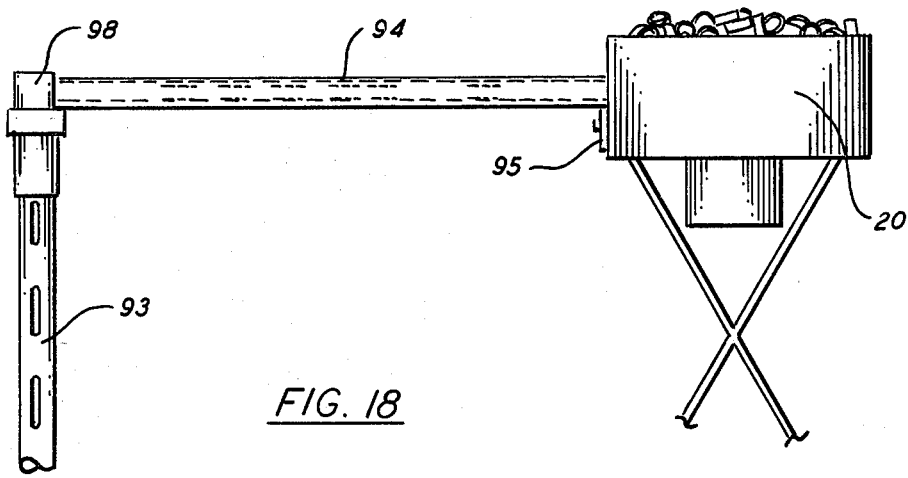
FIG. 18 is a side view illustrating means for feeding individual sleeves into the band applying mechanism shown in FIG. 16.
Figure 19:
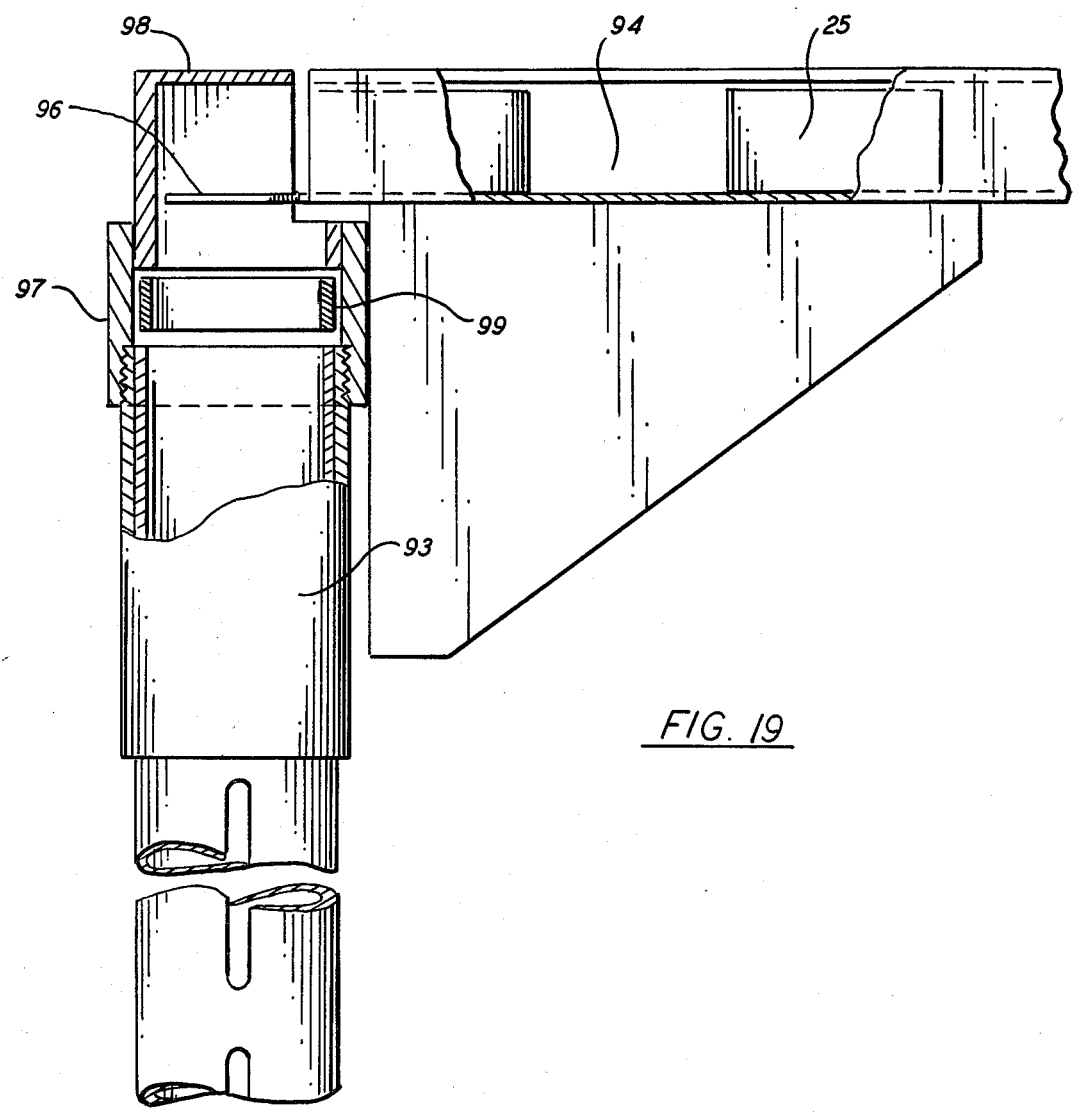
FIG. 19 is an enlarged in partial section illustrating the entrance to the feed tube for delivering sleeves into the band applying mechanism of FIG. 16.

After staking or coining the straps to the shells, the die is further indexed into the forming and banding station F wherein the shell components are shaped into a final assembly and banded together by means of a thin plastic sleeve 25. Special equipment is herein provided to automatically deliver the thin sleeves to the work station. As depicted in FIGS. 18-19, the sleeves are stored in a vibratory bowl 20 and are moved therefrom in series alignment into a vertical feed tube 93 via a substantially enclosed ramp 94 that is secured to the side of the bowl by bracket 95.

As best seen in FIG. 19, the floor 96 of the ramp extends outwardly in a horizontal direction from the main body of the ramp and is suspended over the top entrance of the feed tube. A circular slot is formed in the extended end of the floor to permit individual bands walking down the ramp to fall into the feed tube. The cross-sectional geometry of both the enclosed ramp 94 and the feed tube 93 are such that the sleeves will be continually supported in a vertical position as shown.

An enlarged cylinder 97 is threaded onto the cap at the entrance to the feed tube as illustrated in FIG. 19. A loading member 98 is pressed into the cylinder and is arranged to enclose the extended platform 96 of the ramp. A polished free floating ring 99 is also housed within the cylinder between the top of the feed tube and the bottom of the loading member. In assembly, the upper section of the feed tube is secured by any suitable means to the ramp so that the two cojoined elements are both agitated by the vibratory bowl. In operation, the ring 99 is caused to reciprocate vertically within the cylinder and thus direct the sleeves in transit downwardly into the feed tube.

Turning now more specifically to FIGS. 16-17, it is shown that the lower exit of the feed tube 93 discharges into a slide mechanism 104 for dispensing the sleeves one by one into the work station F. Upon entering the feed tube the sleeves are directed downwardly onto a horizontal plate 100 having upper side margin guides 101 and lower side margin guides 102 associated therewith to create a lateral passageway for guiding the sleeves to a position over the die located in the work station. In operation the slide 104 is driven horizontally along plate 100 by means of an air cylinder 106 acting through arm 105 in response to a timed signal from the machine's control circuitry. The end face 109 of the slide, which engages the sleeve positioned on the plate at the exit to the feed tube is contoured to compliment the sleeve so that the slide will embrace the outer surface of the sleeve as it moves laterally into the work station.

Full extension of the slide will position the sleeve against the contoured surface 108 of the holding block surface 107. A soft spring 110, secured to the bottom of the block 107, is extended vertically along surface 108 and serves to put a slight biasing pressure against a sleeve advanced by the slide into the work station. As illustrated by the phantom outline in FIG. 16, the spring combines with surfaces 109 on the slide and 108 on the block to force the sleeve into a cylindrical posture over the die 12.

Positioned immediately below the holding block 107 is a second gage block 103 having a circular hole 112 formed therein containing an expanded opening 113 facing the die 12. As shown, the centerline 115 of the gage block is coaxially aligned with the central opening 37 passing upwardly through the die and the indexing table.

In practice, a sleeve is first brought into the holding block 107 and then a dejecting rod 117, located below the table, is driven upwardly through hole 37 into driving contact against the bottom of wedge 22 positioned in the die. The wedge is pushed upwardly against the curved midsection of the strap thus lifting the shells out of their respective nests. Continued extension of rod 117 forces the expansion shell components upwardly through the forming gage block wherein the strap is shaped to bring the shell halves in alignment with the wedge. As best seen in FIG. 17, the formed assembly is then passed into the resilient sleeve which is caused to embrace the components and hold them together in their assembled positions.

With the rod 117 fully extended, the slide is pulled back allowing the shell assembly to be cleared from the station. The banded assembly 21 is pushed out of the work station by means of a kicker bar 120 pivotably supported above block 107 by pin 122. A biasing spring 121 acts against the bar to continually urge the bar in a clockwise direction. As a consequence, the shell assembly upwardly through the forming gage is brought into contact with the bar whereupon the assembly is pushed out of the station when the slide is retracted. Although not shown, means are provided to direct the assembled and banded shell into a collecting bin.

It should be noted at this point that the forming gage also functions as an inspection tool which is capable of rejecting misaligned or oversized assemblies. The gage opening is sized so that any such defective assemblies will be prevented from passing therethrough whereby the assembly is rejected before it can be packaged and shipped to the mine site. As can be seen, each assembly produced by the machine of the present invention is thus individually and automatically inspected to insure its reliability when placed in operation.

An optical detector 125 is positioned below the table within work station F to sense the positioning of the rod 117. The sensor is connected into the machine control circuitry so as to prevent the table from being indexed when the rod is in an extended position.

Turning now to FIG. 20 and FIG. 21 there is illustrated a second embodiment of the invention wherein the number of work stations have been reduced to three. As shown in FIG. 20 the stations are positioned at 120° intervals about the table 11. Stations A and F are as described above both in regard to the structure involved and the function thereof. Station G is similar to original station C in regard to its structure; however, as seen in FIG. 21, the shell halves in this embodiment are prestaked to the strap and the subassembly then delivered into the machine. The shell and strap subassemblies 127 are mounted upon a guide channel 79 and placed one by one onto the balance arm assembly 82, as seen in FIG. 10, directly over the die in station G. A contoured pusher arm 85, driven by an air cylinder, as noted above, forces the subassembly downwardly between stationary wall 81 and biasing bar 83 into the die in timed response with the other machine operations.

While this invention has been described with reference to the details as set forth above, it is not limited to the specific structure as disclosed and the invention is intended to cover any modifications or changes as may come within the scope of the following claims.

We claim:

1. In a machine of the type having an indexing table arranged to be periodically advanced through a series of work stations, apparatus for automatically assembling and banding together the components of an expansion shell including
    a plurality of dies arranged to support the shell components therein in a prescribed alignment with each other, each of said dies being secured to the indexing table within one of said work stations,
    loading means operatively associated with said work stations for loading the shell components in sequence into the dies as they are moved in series through the work stations,
    a forming gage positioned adjacent to the die located in the last work station in the series having an opening therein being adapted to form the shell components aligned in said die into an assembly as they are moved through said opening.

a banding block located at the exit to the forming gage opening for supporting a resilient sleeve in substantial axial alignment with the opening, and a dejector means for passing the aligned components contained in the die located in the last station through both the forming gage and banding block whereby the components are brought together in an assembly and banded together by the resilient sleeve.

2. The apparatus of claim 1 wherein each die includes a wedge nest having an opening for receiving a tapered wedge therein and supporting said wedge in a vertical position, a pair of shell nests located on either side of the wedge nest, each shell nest having an inclined platform for receiving a shell thereon and supporting the shell at a prescribed angle with the horizontal plane, and a strap guide for receiving a metal strap therein and aligning the strap over the wedge and shell halves mounted in said die.

3. The apparatus of claim 2 further including a punch located in a work station downstream from the last loading station in the direction of table movement and means for bringing the punch vertically into deforming contact against the shell halves to coin a pair of raised ears on each shells against the strap.

4. The apparatus of claim 3 wherein the working surfaces on said punch for contacting said shell halves are both contoured to compliment the outer surface of the shell halves and are in parallel alignment with the platforms of said die whereby the working surfaces of the punches slide over the ears to incrementally deform said ears against the strap.

5. The apparatus of claim 4 wherein said dejector means includes a rod arranged to move upwardly through the die and pass through the forming gage and banding block whereby the shell components are formed into an assembly and banded together.

6. The apparatus of claim 5 further including a spring biased arm positioned adjacent to the banding block for ejecting a banded assembly from the machine as said assembly is moved through the block by said dejecting rod.

7. Apparatus for assembling and banding together the components of an expansion shell including a die arranged to support the shell components in a predetermined alignment thereon, a forming gage positioned over the die having a passage passing therethrough for conforming the shell components supported upon said die into an assembled relationship when passed therethrough, a banding means positioned adjacent to the exit to said passage in the forming gage for positioning a resilient sleeve over the exit of said passage whereby the assembly moved through the gage is passed into said sleeve, and a dejector for moving the shell components aligned on said die through the passage in the forming gage whereby the components are brought into an assembled relationship and are banded together.

8. The apparatus of claim 7 wherein said banding means includes a stationary block and a movable slide each having a generally semicircular opening therein which compliment the outside surface of a sleeve and cooperate to hold a sleeve in a circular posture over the exit of said forming gage, and means to move said slide between a sleeve loading station and an operative position with said block.

9. The apparatus of claim 8 wherein said banding means further includes a vertical feed tube for gravity feeding sleeves into said loading station.

10. The apparatus of claim 9 further including a free floating ring positioned at the upper entrance to said tube through which the sleeves delivered into said tube pass and means to agitate said ring whereby the sleeves are directed downwardly into said tube in vertical alignment.

11. The apparatus of claim 10 wherein said means to agitate said ring includes a vibratory bowl for storing a quantity of sleeves and an enclosed guideway secured to the entrance of said tube and the vibratory bowl whereby the sleeves in said bowl are caused to move along the guideway into the entrance of said tube.

12. The method of assembling and banding together the components of an expansion shell made up of a wedging nut, two shell halves and a strap, the method including automatically loading the components into a die so that the components are supported in alignment therein, moving the aligned components from said die through the passage of a forming gage whereby the components are brought into a desired assembly with the shell halves symmetrically positioned on either side of the wedging nut, and passing the assembly as it leaves the passage of the forming gage into a resilient sleeve for supporting the components in assembly.

13. The method of claim 12 further including the step of maintaining the size of the passage in the forming gage within limits wherein oversized or misaligned parts will be prevented from passing therethrough.

14. The method of claim 12 further including the step of staking the shell halves to the strap while the components are supported in the die.

* * * * *